US 8,583,844 B2

(12) United States Patent
Pullagoundapatti et al.

(10) Patent No.: US 8,583,844 B2
(45) Date of Patent: Nov. 12, 2013

(54) SYSTEM AND METHOD FOR OPTIMIZING SLAVE TRANSACTION ID WIDTH BASED ON SPARSE CONNECTION IN MULTILAYER MULTILEVEL INTERCONNECT SYSTEM-ON-CHIP ARCHITECTURE

(75) Inventors: Sakthivel Komarasamy Pullagoundapatti, Bangalore (IN); Srinivasa Rao Kothamasu, Prakasam District (IN); Venkat Rao Vallapaneni, Bengaluru (IN); Claus Pribbernow, Munich (DE); Shrinivas Sureban, Bangalore (IN)

(73) Assignee: LSI Corporation, San Jose, CA (US)

( * ) Notice: Subject to any disclaimer, the term of this patent is extended or adjusted under 35 U.S.C. 154(b) by 163 days.

(21) Appl. No.: 13/118,603

(22) Filed: May 31, 2011

(65) Prior Publication Data
US 2012/0311210 A1     Dec. 6, 2012

(51) Int. Cl.
*G06F 13/00*     (2006.01)
*G06F 13/364*    (2006.01)

(52) U.S. Cl.
CPC .................... *G06F 13/364* (2013.01)
USPC ........................................... 710/110

(58) Field of Classification Search
USPC ..................... 710/33–42, 104–110
See application file for complete search history.

(56) References Cited

U.S. PATENT DOCUMENTS

| | | | |
|---|---|---|---|
| 6,393,500 B1 * | 5/2002 | Thekkath ................... | 710/35 |
| 7,145,903 B2 * | 12/2006 | Gutierrez ................... | 370/362 |
| 7,246,185 B1 * | 7/2007 | Pritchard et al. ............ | 710/110 |
| 7,266,632 B2 * | 9/2007 | Dao et al. .................. | 710/317 |
| 8,285,912 B2 * | 10/2012 | Feero et al. ................ | 710/316 |
| 2003/0007457 A1 * | 1/2003 | Farrell et al. ............... | 370/235 |
| 2006/0282588 A1 * | 12/2006 | Proujansky-Bell ........... | 710/240 |
| 2008/0215781 A1 | 9/2008 | Lee et al. | |
| 2009/0070493 A1 * | 3/2009 | Riocreux et al. ............ | 710/16 |
| 2011/0055439 A1 * | 3/2011 | Chen et al. ................. | 710/57 |
| 2011/0072178 A1 * | 3/2011 | Mace ........................ | 710/244 |
| 2011/0225337 A1 * | 9/2011 | Byrne et al. ............... | 710/306 |
| 2012/0047306 A1 * | 2/2012 | Mitsubayashi ............. | 710/306 |

* cited by examiner

*Primary Examiner* — Raymond Phan
(74) *Attorney, Agent, or Firm* — Mendelsohn, Drucker & Dunleavy, P.C.; Steve Mendelsohn (57) ABSTRACT

A system and method for optimizing slave transaction ID width based on sparse connection between multiple masters and multiple slaves in a multilayer multilevel interconnect system-on-chip (SOC) architecture are disclosed. In one embodiment, slave transaction ID widths are computed for a first processing subsystem and a second processing subsystem including multiple masters and multiple slaves. Further, a slave transaction ID for each master to any slave in the first processing subsystem and in the second processing subsystem is generated based on the computed slave transaction ID width. Furthermore, sparse connection information between the multiple masters and multiple slaves is determined via a first bus matrix in the first processing subsystem. A first optimized slave transaction ID for each master to any slave in the first processing subsystem is then generated by removing don't care bits in each generated slave transaction ID based on the sparse connection information.

16 Claims, 7 Drawing Sheets

FIG. 1

| | ACTUAL MASTER ID | INTERCONNECT ID | SLAVE TRANSACTION ID |
|---|---|---|---|
| FIRST PROCESSING SUBSYSTEM 102A | | 202 | 204 | 206 |
| 208 — M104A TO S106A-C | ID1ID0 | 00 | 00ID1ID0_00 |
| 210 — M104B TO S106A-C | ID0 | 01 | 000ID0_01 |
| 212 — M104C TO S106A-C | ID3ID2ID1ID0 | 10 | ID3ID2ID1ID0_10 |
| SECOND PROCESSING SUBSYSTEM 102B | ACTUAL MASTER ID | INTERCONNECT ID | SLAVE TRANSACTION ID |
| 214 — M108A TO S110A-C | ID1ID0 | 00 | 0000ID1ID0_00 |
| 216 — M108B TO S110A-C | ID2ID1ID0 | 01 | 000ID2ID1ID0_01 |
| 218 — M108C TO S110A-C | ID5ID4ID3ID2ID1ID0 | 10 | ID5ID4ID3ID2ID1ID0_10 |

|  | M104A | M104B | M104C |
|---|---|---|---|
| 402 ~ S106A | X | X | X |
| 404 ~ S106B | - | X | X |
| 406 ~ S106C | X | X | - |

|  | 702 | 704 | 706 |
|---|---|---|---|
| FIRST PROCESSING SUBSYSTEM 102A | ACTUAL MASTER ID | INTERCONNECT ID | SECOND OPTIMIZED SLAVE TRANSACTION ID |
| 708 M104A TO S106A-C | ID1ID0 | 00 | 00ID1ID0_00 |
| 710 M104B TO S106A-C | ID0 | 01 | 00ID0_01 |
| 712 M104C TO S106A-C | ID3ID2ID1ID0 | 10 | ID3ID2ID1ID0_10 |
| SECOND PROCESSING SUBSYSTEM 102B | ACTUAL MASTER ID | INTERCONNECT ID | SECOND OPTIMIZED SLAVE TRANSACTION ID |
| 714 M108A TO S110A-C | ID1ID0 | 00 | 0ID1ID0_00 |
| 716 M108B TO S110A-C | ID2ID1ID0 | 01 | ID2ID1ID0_01 |
| 718 M108C TO S110A-C | ID2ID1ID0 | 10 | ID2ID1ID0_10 |

SYSTEM AND METHOD FOR OPTIMIZING SLAVE TRANSACTION ID WIDTH BASED ON SPARSE CONNECTION IN MULTILAYER MULTILEVEL INTERCONNECT SYSTEM-ON-CHIP ARCHITECTURE

TECHNICAL FIELD

The present invention relates generally to multilayer multilevel interconnect semiconductor chips, and more particularly to bus matrix structure used to route transactions from multiple master interfaces onto a shared slave interface in multilayer multilevel interconnect system-on-chip (SOC) architecture.

BACKGROUND

Advanced extensible interface (AXI) interconnect network of an advanced microcontroller bus architecture (AMBA) is a conventional bus matrix configuration. Typically, the AXI interconnect network is formed as a bus matrix with a plurality of channels. The plurality of channels is connected to a plurality of masters and slaves by multiplexers and demultiplexers along with an arbitration logic, a buffering logic, a data width conversion logic, a frequency conversion logic and so on. The masters can access different slaves at the same time by way of the AXI interconnect network.

Generally, the AXI interconnect network consists of 5 independent channels: address write (AW), address read (AR), write data (W), read data (R), and write response (B), which provide a powerful support for out-of-order transaction completion. A typical write transaction uses AW, W, and B channels and a typical read transaction uses AR and R channels. These independent channels are connected via associated transaction identifications (IDs) when a transaction is in progress.

In a multilayer multilevel interconnect architecture, multiple master interfaces can be connected to a shared slave interface. Typically, the bus matrix is used to route the transactions from the multiple master interfaces onto the shared slave interface. A slave transaction ID width is generated based on the largest master ID width and number of masters connected to the associated bus matrix using the following equation:

slave transaction ID width=largest master ID width+ $\log_2$(total number of masters)

When the total number of masters is not a multiple of 2, $\log_2$(total number of master) is rounded to a next integer value.

In the above scenario, all shared slaves' use the same transaction ID widths irrespective of a system level sparse connection, i.e., all the masters may not be connected to all the slaves. In a system with multiple bus matrices, slave transaction ID widths are generated without considering the system level sparse connection, which can lead to requiring more than needed overall increased slave transaction ID width, which in-turn may lead to requiring additional hardware. Further, with increased slave transaction ID widths, it can be difficult to interface with existing standard slave components, such as Cortex™-R4 slave interface.

SUMMARY

A system and method for optimizing a slave transaction identification (ID) width based on sparse connection in a multilayer multilevel interconnect system-on-chip (SOC) architecture are disclosed. In accordance with one aspect of the present invention, slave transaction ID widths are computed for a first processing subsystem including multiple masters and multiple slaves and a second or subsequent processing subsystem including multiple masters and multiple slaves. Further, a slave transaction ID is generated for each master to any slave in the first processing subsystem and in the second processing subsystem based on the computed slave transaction ID widths for the first processing subsystem and the second processing subsystem. Furthermore, sparse connection information between the multiple masters and the multiple slaves is determined via a first bus matrix in the first processing subsystem. Based on the sparse connection information obtained, a first optimized slave transaction ID is generated for each master to any slave in the first processing subsystem by removing don't care bits (e.g., most/least significant bits that are equal to zero) present in each generated slave transaction ID.

In addition in this embodiment, it is determined whether there are any further don't care bits left in the generated first optimized slave transaction ID for each master in the first processing subsystem and the second processing subsystem. A second optimized slave transaction ID is then generated by removing any common don't care bits left in the generated first optimized slave transaction ID for each master based on the determination.

According to another aspect of the present invention, the system for optimizing the slave transaction ID width based on the sparse connection in the multilayer multilevel interconnect SOC architecture includes a first processing subsystem including multiple masters and multiple slaves. The multiple masters are connected to the multiple slaves via a first bus matrix and the respective master interfaces and slave interfaces. Further, the system includes a second processing subsystem including multiple masters and multiple slaves. Furthermore, the multiple masters are connected to the multiple slaves via a second bus matrix and the respective master interfaces and slave interfaces. In addition, the system includes a third bus matrix that connects the first processing subsystem and the second processing subsystem via a slave interface of the first bus matrix in the first processing subsystem and a master interface of the second bus matrix in the second processing subsystem. Moreover, the slave transaction ID width of each master associated with the first processing subsystem and the slave transaction ID width of each master associated with the second processing subsystem are based on a first optimized slave transaction ID.

The methods and systems disclosed herein may be implemented in any means for achieving various aspects, and other features will be apparent from the accompanying drawings and from the detailed description that follows.

BRIEF DESCRIPTION OF THE DRAWINGS

Various embodiments are described herein with reference to the drawings, wherein.

The drawings described herein are for illustration purposes only and are not intended to limit the scope of the present invention in any way.

DETAILED DESCRIPTION

A system and method for optimizing a slave transaction identification (ID) width based on sparse connection in a multilayer multilevel interconnect system-on-chip (SOC) architecture are disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
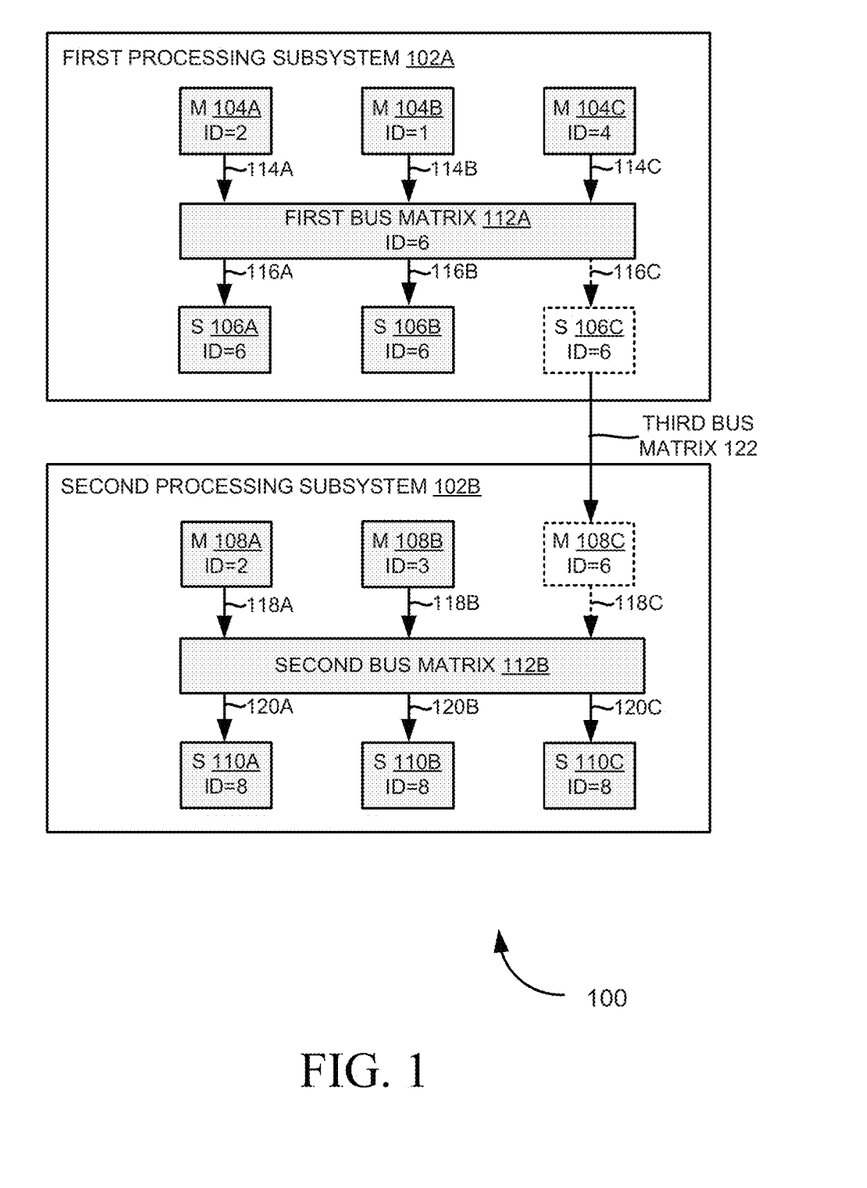
FIG. 1 is a block diagram illustrating slave transaction ID widths in a multilayer multilevel interconnect system-on-chip (SOC) architecture, in the context of the invention.

FIG. 1 is a block diagram illustrating slave transaction ID widths in a multilayer multilevel interconnect SOC 100 architecture, in the context of the invention. Particularly, FIG. 1 illustrates the multilayer multilevel interconnect SOC 100 including a first processing subsystem 102A and a second processing subsystem 102B. Exemplary first processing subsystem 102A and second processing subsystem 102B include a microprocessor, a direct memory access (DMA), a memory controller, a display controller, a camera controller, an interrupt controller, a timer and/or any other module which supports ID based transactions. As shown in FIG. 1, the first processing subsystem 102A includes multiple masters M104A-C, multiple slaves S106A-C and a first bus matrix 112A. For example, the first processing subsystem 102A can also include one or more other processing subsystems in the multilayer multilevel interconnect SOC 100. Further as shown in FIG. 1, the second processing subsystem 102B includes multiple masters M108A-C, multiple slaves S110A-C and a second bus matrix 112B. For example, the second processing subsystem 102B can also include one or more other processing subsystems sequentially connected to the first processing subsystem 102A in the multilayer multilevel interconnect SOC 100. Exemplary masters in the first processing subsystem 102A and the second processing subsystem 102B include a microprocessor, a DMA, a digital signal processing device (DSP) and the like. Exemplary slaves in the first processing subsystem 102A and the second processing subsystem 102B include a timer, an interrupt controller, a unified asynchronous receiver transmitter (UART) peripheral device, a module, an interface and the like.

As shown in FIG. 1, in the first processing subsystem 102A, the masters M104A-C are connected to the slaves S106A-C via the first bus matrix 112A and the respective master interfaces 114A-C and slave interfaces 116A-C. Further as shown in FIG. 1, in the second processing subsystem 102B, the masters M108A-C are connected to the slaves S110A-C via the second bus matrix 112B and the respective master interfaces 118A-C and slave interfaces 120A-C. Furthermore as shown in FIG. 1, the multilayer multilevel interconnect SOC 100 includes a third bus matrix 122. The third bus matrix 122 is a direct point-to-point connection which communicatively couples the first processing subsystem 102A and the second processing subsystem 102B via the slave interface 116C connected to the first bus matrix 112A in the first processing subsystem 102A and the master interface 118C connected to the second bus matrix 112B in the second processing subsystem 102B.

In addition as shown in FIG. 1, in the first processing subsystem 102A, the master M104A has a master ID width of 2, the master M104B has a master ID width of 1 and the master M104C has a master ID width of 4. Based on the master ID widths of the masters M104A-C, a slave transaction ID width for the first processing subsystem 102A is computed using the following equation:

$$\text{slave transaction ID width} = \text{largest master ID width} + \log_2(\text{total number of masters}) \quad (1)$$

As seen in FIG. 1, the largest master ID width in the first processing subsystem 102A is 4 and the total number of masters in the first processing subsystem 102A is 3. Since the total number of masters is not a multiple of 2, $\log_2$(total number of masters) is rounded to a next integer value. Therefore, the slave transaction ID width for the first processing subsystem 102A is computed as:

$$\text{slave transaction ID width} = 4 + \log_2(3) = 6$$

Further, each of the slaves S106A-C in the first processing subsystem 102A has the slave transaction ID width of 6.

Also as shown in FIG. 1, in the second processing subsystem 102B, the master M108A has a master ID width of 2 and the master M108B has a master ID width of 3. In addition as shown in FIG. 1, the master M108C is coupled to the slave S106C via the third bus matrix 122. Therefore, the master M108C and the slave S106C have the same master ID width of 6. Further, similar to the first processing subsystem 102A, the slave transaction ID width for the second processing subsystem 102B is also computed using the equation (1). As a result of the computation, the slave transaction ID width for all the slaves S110A-C in the second processing subsystem 102B is obtained as 8. Generating the slave transaction IDs, based on the computed slave transaction ID widths, for the first processing subsystem 102A and the second processing subsystem 102B is explained in more detail with reference to FIG. 2.

Figure 2:
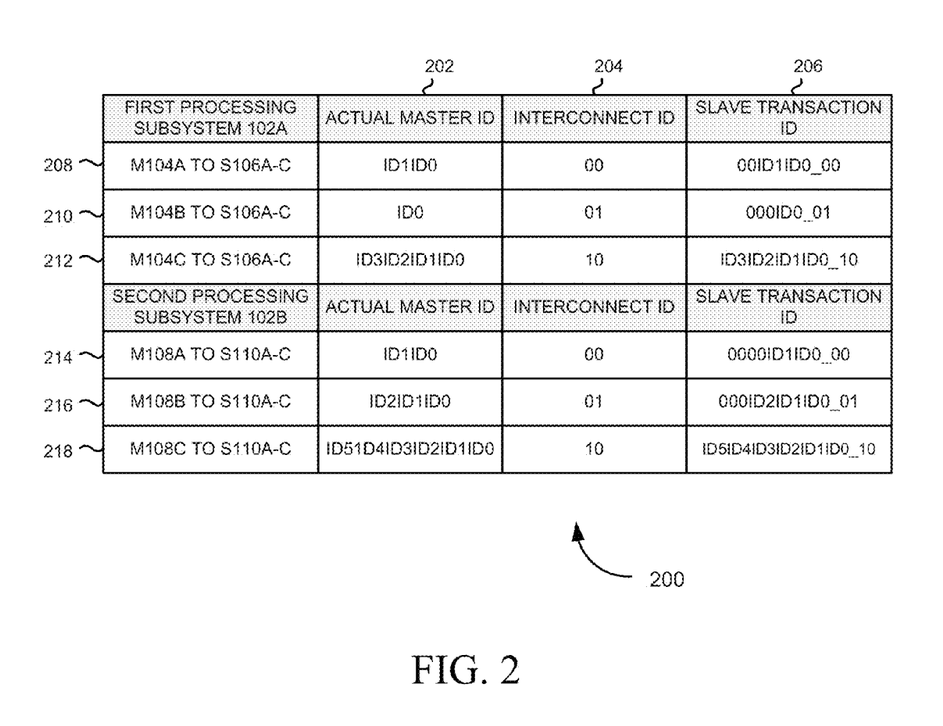
FIG. 2 is a table showing the slave transaction IDs generated for the multilayer multilevel interconnect SOC, such as the one shown in FIG. 1, in the context of the invention.

Referring now to FIG. 2, a table 200 includes all slave transaction IDs generated for the multilayer multilevel interconnect SOC 100, such as the one shown in FIG. 1, in the context of the invention. As shown in the table 200, row 208, row 210 and row 212 include the slave transaction IDs generated for transactions between each of the masters M104A-C and any of the slaves S106A-C in the first processing subsystem 102A. Further as shown in the table 200, row 214, row 216 and row 218 include the slave transaction IDs generated for transactions between each of the masters M108A-C and any of the slaves S110A-C in the second processing subsystem 102B.

Furthermore as shown in the table 200, column 202 includes an actual master ID for each of the masters M104A-C and the masters M108A-C in the first processing subsystem 102A and the second processing subsystem 102B, respectively. The actual master ID is based on the master ID width of each of the masters M104A-C and the masters M108A-C in the first processing subsystem 102A and the second processing subsystem 102B, respectively, as described in detail with reference to FIG. 1. Moreover as shown in the table 200, column 204 includes interconnect ID for the interconnection between each of the masters M104A-C and any of the slaves S106A-C in the first processing subsystem 102A and the interconnect ID for the interconnection between each of the masters M108A-C and any of the slaves S110A-C in the second processing subsystem 102B. Also as shown in the table 200, column 206 includes the slave transaction IDs generated, based on the slave transaction ID widths obtained as shown in FIG. 1, for the transactions between each of the masters M104A-C and any of the slaves S106A-C in the first processing subsystem 102A and for the transactions between each of the masters M108A-C and any of the slaves S110A-C in the second processing subsystem. As described with reference to FIG. 1, the slave transaction ID width computed for the first processing subsystem 102A is 6 and the slave transaction ID width computed for the second processing subsystem 102B is 8.

In the table 200, a slave transaction ID is generated by appending the interconnect ID to the least significant bit (LSB) position of the corresponding actual master ID. However, the interconnect ID can be appended to the LSB position or most significant bit (MSB) position of the actual master ID based on the design of the bus matrix. After appending the interconnect ID to the actual master ID, if the generated slave transaction ID has fewer bits than the computed slave transaction ID width, then the slave transaction ID is appended with zeros in the MSB position until the number of bits in the slave transaction ID is equal to the computed slave transaction ID width.

Now, referring to the row 208 in the table 200, M104A to S106A-C represents transactions between the master M104A and any of the slaves S106A-C in the first processing subsystem 102A. As shown in the row 208, the actual master ID for the master M104A is ID1ID0 and the interconnect ID is 00. Therefore, the generated slave transaction ID for M104A to S106A-C is 00ID1ID0_00 after appending two zeros to the MSB position. Further in the table 200, in the row 210, M104B to S106A-C represents transactions between the master M104B and any of the slaves S106A-C in the first processing subsystem 102A. Furthermore, as shown in the row 210, the actual master ID for the master M104B is ID0 and the interconnect ID is 01. Therefore, the generated slave transaction ID for M104B to S106A-C is 000ID0_01 after appending three zeros to the MSB position. In addition in the table 200, in the row 212, M104C to S106A-C represents transactions between the master M104C and any of the slaves S106A-C in the first processing subsystem 102A. Also as shown in the row 212, the actual master ID for the master M104C is ID3ID2ID1ID0 and the interconnect ID is 10. Therefore, the generated slave transaction ID for M104C to S106A-C is ID3ID2ID1ID0_10 without appending zeros to the MSB position.

Moreover in the table 200, in the row 214, M108A to S110A-C represents transactions between the master M108A and any of the slaves S110A-C in the second processing subsystem 102B. Further as shown in the row 214, the actual master ID for the master M108A is ID1ID0 and the interconnect ID is 00. Therefore, the generated slave transaction ID for M108A to S110A-C is 0000ID1ID0_00 after appending four zeros to the MSB position. Further in the table 200, in the row 216, M108B to S110A-C represents transactions between the master M108B and any of the slaves S110A-C in the second processing subsystem 102B. Furthermore as shown in the row 216, the actual master ID for the master M108B is ID2ID1ID0 and the interconnect ID is 01. Therefore, the generated slave transaction ID for M108B to S110A-C is 000ID2ID1ID0_01 after appending three zeros to the MSB position. In addition in the table 200, in the row 218, M108C to S110A-C represents transactions between the master M108C and any of the slaves S110A-C in the second processing subsystem 102B. Also as shown in the row 218, the actual master ID for the master M108C is ID5ID4ID3ID2ID1ID0 and the interconnect ID is 10. Therefore, the generated slave transaction ID for M108C to S110A-C is ID5ID4ID3ID2ID1ID0_10 without appending zeros to the MSB position.

Figure 3:
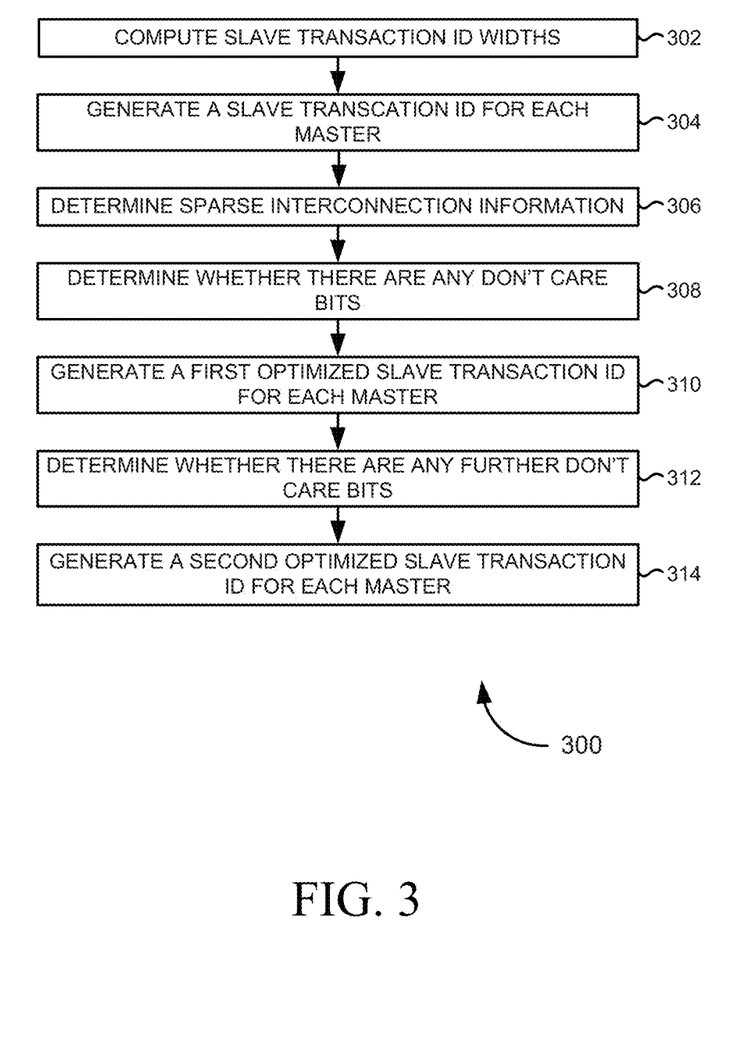
FIG. 3 illustrates a flow diagram of a method of optimizing the slave transaction ID width based on sparse connection in the multilayer multilevel interconnect SOC architecture, according to an embodiment.

Referring now to FIG. 3, which illustrates a flow diagram 300 of a method of optimizing a slave transaction ID width based on sparse connection in the multilayer multilevel interconnect SOC 100, such as the one shown in FIG. 1, according to an embodiment. At block 302, the slave transaction ID widths are computed for a first processing subsystem including multiple masters and multiple slaves and a second processing subsystem including multiple masters and multiple slaves. Exemplary first processing subsystem and second processing subsystem includes a microprocessor, a DMA, a memory controller, a display controller, a camera controller, an interrupt controller, a timer and/or any other module which supports ID based transactions.

The slave transaction ID widths for the first processing subsystem including the multiple masters and the multiple slaves and for the second processing subsystem including the multiple masters and the multiple slaves are computed using equation:

slave transaction ID width=largest master interface ID width+log$_2$(total number of master interfaces).

At block 304, a slave transaction ID is generated for each master to any slave in the first processing subsystem and for each master to any slave in the second processing subsystem based on the computed slave transaction ID widths for the first processing subsystem and the second processing subsystem. In generating the first optimized slave transaction ID and the second optimized slave transaction ID, the multiple masters in the first processing system are connected to the associated multiple slaves via a first bus matrix and the respective master interfaces and slave interfaces. Further, the multiple masters in the second processing system are connected to the associated multiple slaves via a second bus matrix and the respective master interfaces and slave interfaces. Furthermore, a third bus matrix connects the first processing subsystem and the second processing subsystem via a slave interface of the first processing subsystem and a master interface of the second processing subsystem.

At block 306, sparse connection information between the multiple masters and the multiple slaves is determined via the first bus matrix in the first processing subsystem. This is explained in more detail with reference to FIG. 4. At block 308, it is determined whether there are any common don't care bits in the generated slave transaction ID for each master based on the determined sparse connection information. The don't care bits may include most/least significant bits that are equal to zero. At block 310, a first optimized slave transaction ID is generated for each master to any slave in the first processing subsystem by removing the common don't care bits in the generated slave transaction ID based on the determination. This is explained in detail with reference to FIGS. 5 and 6. In one example embodiment, the second processing subsystem is considered to have full matrix connection, i.e., all the masters are connected to all the slaves in the second processing subsystem. However, one can envision the second bus matrix in second processing subsystem also having a sparse connection for optimization.

At block 312, it is determined whether there are any further don't care bits left in the generated first optimized slave transaction ID for each master in the first processing subsystem and the second processing subsystem. At block 314, a second optimized slave transaction ID is generated by removing any common don't care bits left in the generated first optimized slave transaction ID for each master based on the determination. This is explained in more detail with reference to FIG. 7.

Figure 4:
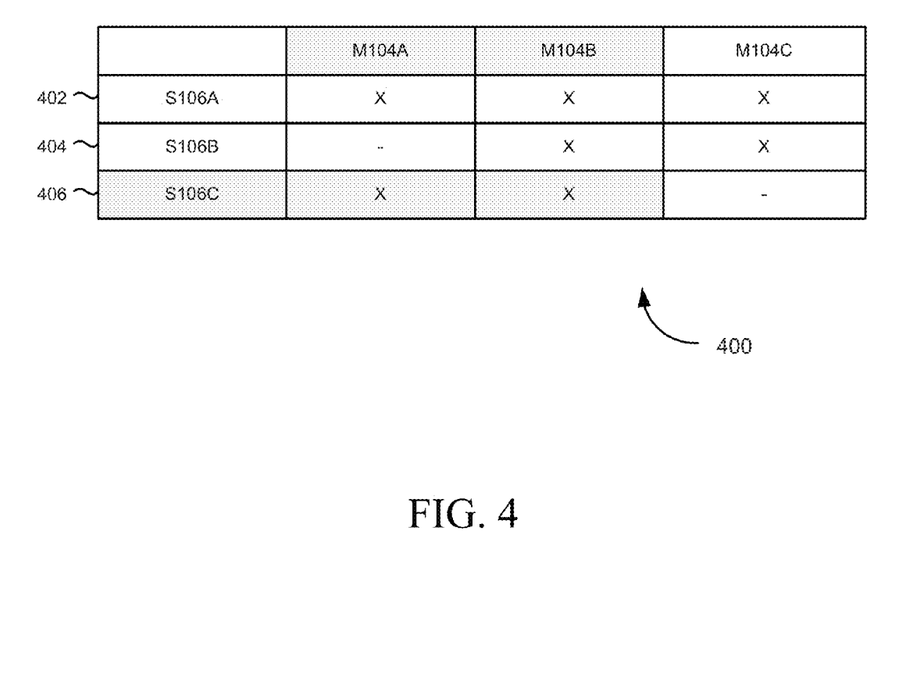
FIG. 4 is a table showing sparse connection information between the multiple masters and the multiple slaves determined via a first bus matrix in the multilayer multilevel interconnect SOC, such as the one shown in FIG. 1, according to an embodiment.

Referring now to FIG. 4, a table 400 includes the sparse connection information between the masters M104A-C and the slaves S106A-C via the first bus matrix 112A in the multilayer multilevel interconnect SOC 100, such as the one shown in FIG. 1, according to an embodiment. In the table 400, the symbol 'X' indicates presence of an interconnection between the specific master and slave. Further in the table 400, the symbol '-' indicates that there is no interconnection between the specific master and the slave. In this embodiment, the second processing subsystem 102B is considered to have full matrix connection, i.e., all the masters M108A-C are connected to all the slaves S110A-C via the second bus matrix 112B.

Now, referring to row 402 in the table 400, the slave S106A is interconnected to all the masters M104A-C. Further, referring to row 404 in the table 400, the slave S106B is interconnected to the master M104B and the master M104C. Furthermore, referring to row 406 in the table 400, the slave S106C is interconnected to the master M104A and the master M104B. Based on the sparse connection information obtained from the table 400, the slave transaction IDs are optimized as explained in more detail with reference to FIGS. 5 and 6.

Figure 5:
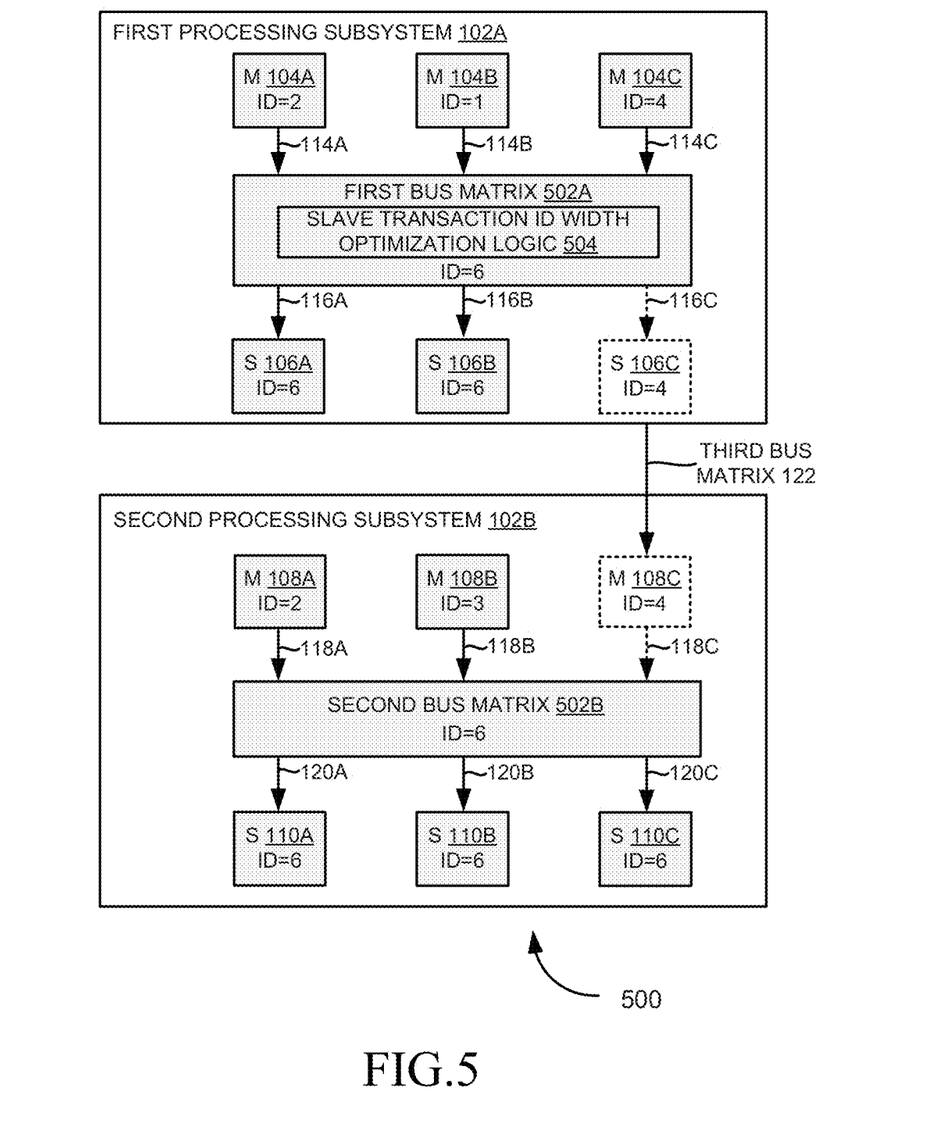
FIG. 5 is a block diagram illustrating slave transaction ID widths in a multilayer multilevel interconnect SOC architecture, according to an embodiment.

Referring now to FIG. 5, a block diagram illustrates slave transaction ID widths in a multilayer multilevel interconnect SOC 500 architecture, according to an embodiment. The multilayer multilevel interconnect SOC 500, shown in FIG. 5, is similar to the multilayer multilevel interconnect SOC 100, shown in FIG. 1, except that the multilayer multilevel interconnect SOC 500 includes a first bus matrix 502A which further includes a slave transaction ID width optimization logic 504. In one embodiment, the slave transaction ID width optimization logic 504 optimizes the slave transaction ID widths based on the sparse connection information obtained from the table 400 shown in FIG. 4.

As shown in FIG. 5, the multilayer multilevel interconnect SOC 500 includes the first processing subsystem 102A and the second processing subsystem 102B. Further as shown in FIG. 5, the first processing subsystem 102A includes multiple masters M104A-C, multiple slaves S106A-C and the first bus matrix 502A. Furthermore as shown in FIG. 5, the second processing subsystem 102B includes multiple masters M108A-C, multiple slaves S110A-C and the second bus matrix 502B.

In addition as shown in FIG. 5, the masters M104A-C are connected to the slaves S106A-C via the first bus matrix 502A and the respective master interfaces 114A-C and slave interfaces 116A-C in the first processing subsystem 102A. Moreover as shown in FIG. 5, the masters M108A-C are connected to the slaves S110A-C via the second bus matrix 502B and the respective master interfaces 118A-C and slave interfaces 120A-C in the second processing subsystem 102B. Also as shown in FIG. 5, similar to the multilayer multilevel interconnect SOC 100 shown in FIG. 1, the multilayer multilevel interconnect SOC 500 also includes the third bus matrix 122. The third bus matrix 122 is the direct point-to-point connection which communicatively couples the first processing subsystem 102A and the second processing subsystem 102B via the slave interface 116C connected to the first bus matrix 502A in the first processing subsystem 102A and the master interface 118C connected to the second bus matrix 502B in the second processing subsystem 102B.

Similar to the multilayer multilevel interconnect SOC 100, shown in FIG. 1, the slave transaction ID width for the first processing subsystem 102A, shown in FIG. 5, is also computed using the equation (1). Therefore, the slave transaction ID width for all the slaves S106A-C in the first processing subsystem 102A is obtained as 6. The generated slave transaction IDs for the first processing subsystem 102A in the multilayer multilevel interconnect SOC 500, shown in FIG. 5, is explained in more detail with reference to FIG. 6.

In this embodiment, the slave transaction ID width for the slave S106C in the first processing subsystem 102A is optimized, by the slave transaction ID width optimization logic 504, using the sparse connection information obtained from the table 400, shown in FIG. 4. Based on the sparse connection information obtained from the table 400, it can be seen that the slave S106C is interconnected to the master M104A and the master M104B. Therefore, possible slave transaction IDs for the slave S106C are 00ID1ID0_00 and 000ID0_01, which are obtained from the table 200, shown in FIG. 2. In the possible slave transaction IDs for the slave S106C, the MSB two bits are don't care bits. The don't care bits are bits that are equal to zero. These common don't care bits in the possible slave transaction IDs for the slave S106C are removed to generate the first optimized slave transaction ID for the slave S106C. As a result, the first optimized slave transaction ID width for the slave S106C is reduced to 4 bits which is sufficient to carry the slave transaction ID information.

Further in this embodiment, as the master M108C is coupled to the slave S106C via the third bus matrix 122, as shown in FIG. 5, the master ID width for the master M108C is also reduced to 4. Furthermore, the slave transaction ID width for the second processing subsystem 102B is computed using the equation (1). As shown in FIG. 5, the largest master ID width for the second processing subsystem 102B is 4 and the total number of masters in the second processing subsystem 102B is 3. As a result, the first optimized slave transaction ID width for all the slaves S110A-C in the second processing subsystem 102B is reduced to 6, as shown in FIG. 5. In this embodiment, the second processing subsystem is considered to have full matrix connection. The generated first optimized slave transaction ID width for the second processing subsystem 102B in the multilayer multilevel interconnect SOC 500, shown in FIG. 5, is explained in more detail with reference to FIG. 6.

Figure 6:
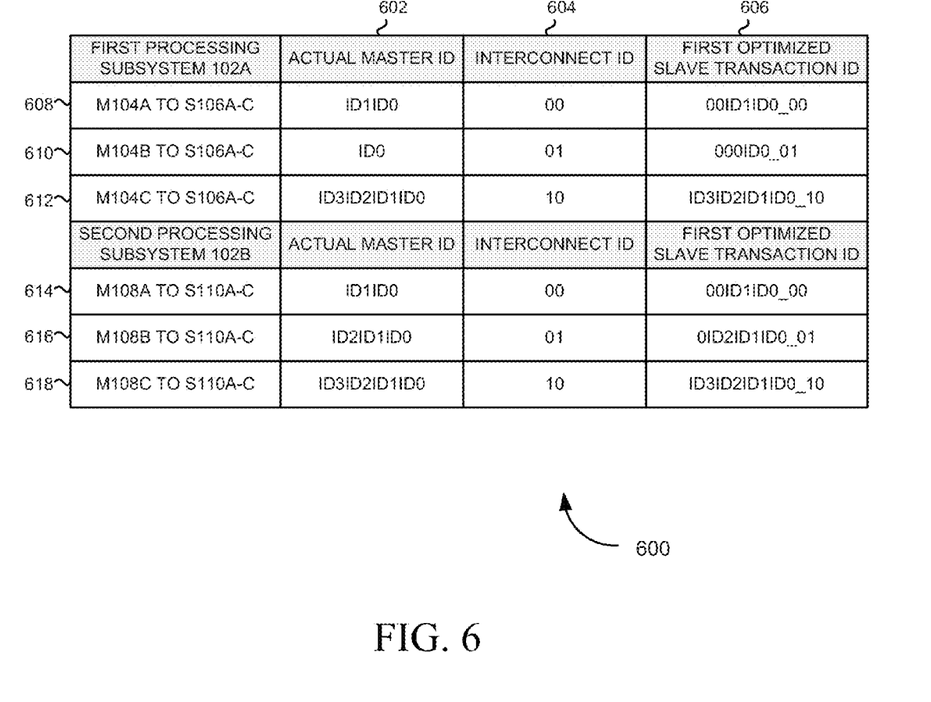
FIG. 6 is a table showing first optimized slave transaction IDs generated for the multilayer multilevel interconnect SOC, such as the one shown in FIG. 5, according to an embodiment.

Referring now to FIG. 6, a table 600 includes the first optimized slave transaction IDs generated for the multilayer multilevel interconnect SOC 500, such as the one shown in FIG. 5, according to an embodiment. As shown in the table 600, row 608, row 610 and row 612 include the first optimized slave transaction IDs generated for the transactions between each of the masters M104A-C and any of the slaves S106A-C in the first processing subsystem 102A. Further as shown in the table 600, row 614, row 616 and row 618 include the first optimized slave transaction IDs generated for the transactions between each of the masters M108A-C and any of the slaves S110A-C in the second processing subsystem 102B.

As shown in the table 600, column 602 includes the actual master ID for each of the masters M104A-C and the masters M108A-C in the first processing subsystem 102A and the second processing subsystem 102B, respectively. The actual master ID is based on the master ID width of each of the masters M104A-C and the masters M108A-C in the first processing subsystem 102A and the second processing subsystem 102B, respectively, as described in detail with reference to FIG. 5. Moreover as shown in the table 600, column 604 includes interconnect ID for the interconnection between each of the masters M104A-C and any of the slaves S106A-C in the first processing subsystem 102A and the interconnect ID for the interconnection between each of the masters M108A-C and any of the slaves S110A-C in the second processing subsystem 102B. Also as shown in the table 600, column 606 includes the first optimized slave transaction IDs generated for the transactions between each of the masters M104A-C and any of the slaves S106A-C and the first optimized slave transaction IDs generated for the transactions between each of the masters M108A-C and any of the slaves S110A-C based on the first optimized slave transaction ID widths. As shown in FIG. 5, the first optimized slave transaction ID width for the first processing subsystem 102A is 6 and the first optimized slave transaction ID width for the second processing subsystem 102B is also 6. In other words, the slave transaction ID width for all the slaves S110A-C in the second processing subsystem 102B is 6.

Also, similar to the table 200, in the table 600, the slave transaction ID is generated by appending the interconnect ID to the least significant bit (LSB) position of the corresponding actual master ID. However, the interconnect ID can be appended to the LSB position or most significant bit (MSB) position of the actual master ID based on the design of the bus matrix. After appending the interconnect ID, if the generated slave transaction ID has fewer bits than the computed first optimized slave transaction ID width, the slave transaction ID is appended with zeros in the MSB position until the number of bits in the slave transaction ID is equal to the computed first optimized slave transaction ID width.

Now, referring to the row 608 in the table 600, M104A to S106A-C represents transactions between the master M104A and any of the slaves S106A-C in the first processing subsystem 102A. As shown in the row 608, the actual master ID for the master M104A is ID1ID0 and the interconnect ID is 00. Therefore, the generated first optimized slave transaction ID for M104A to S106A-C is 00ID1ID0_00 after appending two zeros to the MSB position. Further in the table 600, in the row 610, M104B to S106A-C represents transactions between the master M104B and any of the slaves S106A-C in the first processing subsystem 102A. Furthermore, as shown in the row 610, the actual master ID for the master M104B is ID0 and the interconnect ID is 01. Therefore, the generated first optimized slave transaction ID for M104B to S106A-C is 000ID0_01 after appending three zeros to the MSB position. In addition in the table 600, in the row 612, M104C to S106A-C represents transactions between the master M104C and any of the slaves S106A-C in the first processing subsystem 102A. Also as shown in the row 612, the actual master ID for the master M104C is ID3ID2ID1ID0 and the interconnect ID is 10. Therefore, the generated first optimized slave transaction ID for M104C to S106A-C is ID3ID2ID1ID0_10 without appending zeros to the MSB position.

Moreover in the table 600, in the row 614, M108A to S110A-C represents transactions between the master M108A and any of the slaves S110A-C in the second processing subsystem 102B. Further as shown in the row 614, the actual master ID for the master M108A is ID1ID0 and the interconnect ID is 00. Therefore, the generated first optimized slave transaction ID for M108A to S110A-C is 00ID1ID0_00 after appending two zeros to the MSB position. Further in the table 600, in the row 616, M108B to S110A-C represents transactions between the master M108B and any of the slaves S110A-C in the second processing subsystem 102B. Furthermore as shown in the row 616, the actual master ID for the master M108B is ID2ID1ID0 and the interconnect ID is 01. Therefore, the generated first optimized slave transaction ID for M108B to S110A-C is 0ID2ID1ID0_01 after appending one zero to the MSB position. In addition in the table 600, in the row 618, M108C to S110A-C represents transactions between the master M108C and any of the slaves S110A-C in the second processing subsystem 102B. Also as shown in the row 618, the actual master ID for the master M108C is ID3ID2ID1ID0, based on the first optimized slave transaction ID width obtained from the sparse connection in the first bus matrix 502A, and the interconnect ID is 10. Therefore, the generated first optimized slave transaction ID for M108C to S110A-C is ID3ID2ID1ID0_10 without appending zeros to the MSB position.

In one embodiment, the first optimized slave transaction IDs are further optimized by determining whether there are further don't care bits left in the generated first optimized slave transaction IDs. This is explained in more detail with reference to FIG. 7.

Figure 7:
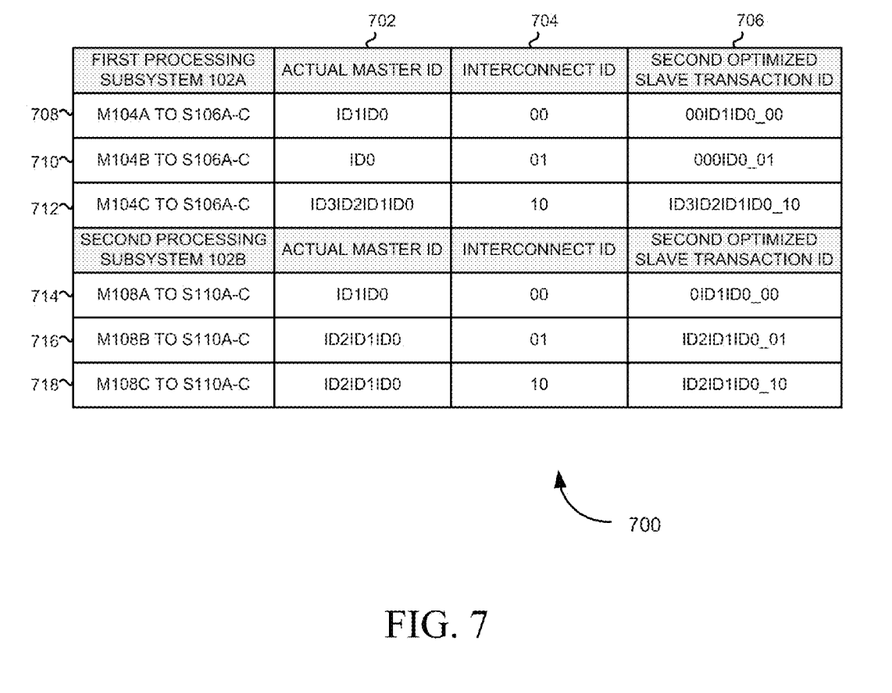
FIG. 7 is a table showing second optimized slave transaction IDs generated for the multilayer multilevel interconnect SOC, such as the one shown in FIG. 5, according to an embodiment.

Now referring to FIG. 7, a table 700 includes second optimized slave transaction IDs generated for the multilayer multilevel interconnect SOC 500, such as the one shown in FIG. 5, according to another embodiment. As shown in the table 700, row 708, row 710 and row 712 include the second optimized slave transaction IDs generated for the first processing subsystem 102A. Further as shown in the table 700, row 714, row 716 and row 718 include the second optimized slave transaction IDs generated for the second processing subsystem 102B.

Furthermore as shown in the table 700, column 702 includes the actual master ID for each of the masters M104A-C and the masters M108A-C in the first processing subsystem 102A and the second processing subsystem 102B, respectively. The actual master ID is based on the master ID width of each of the masters M104A-C and the masters M108A-C as described in detail with reference to FIGS. 5 and 6. Moreover as shown in the table 700, column 704 includes interconnect ID for the interconnection between each of the masters M104A-C to any of the slaves S106A-C in the first processing subsystem 102A and the interconnect ID for the interconnection between each of the masters M108A-C to any of the slaves S110A-C in the second processing subsystem 102B. Also as shown in the table 700, column 706 includes the second optimized slave transaction IDs generated for transactions between each of the masters M104A-C to any of the slaves S106A-C and the transactions between each of the masters M108A-C to any of the slaves S110A-C.

Furthermore, as described with reference to FIGS. 5 and 6, the first optimized slave transaction ID width for the slave S106C is 4. In this embodiment, the second optimized slave transaction ID is based on subsequent optimization of the first optimized slave transaction ID. Further in this embodiment, the second optimized slave transaction ID is obtained by determining whether there are any further don't care bits in the generated first optimized slave transaction IDs, as shown in FIG. 6.

As described with reference to FIG. 6, based on the sparse connection information obtained from the table 400, the possible slave transaction IDs for the slave S106C are obtained as 00ID1ID0_00 and 000ID0_01. The possible first optimized slave transaction IDs include don't care MSB bits which are removed to obtain the first optimized slave transaction IDs: ID1ID0_00 and 0ID0_01, as described with reference to FIG. 6. In this embodiment, it is determined whether there are any further don't care bits in the generated first optimized slave transaction IDs. The determined don't care bits are removed from the first optimized slave transaction IDs to obtain the second optimized slave transaction IDs. Therefore, the LSB bit [1] is removed from the first optimized slave transaction IDs to further reduce the slave transaction ID width for the slave S106C to 3. As a result, the master ID width for the master M108C is also reduced to 3 and the second optimized slave transaction ID width for the second processing subsystem 102B is obtained as 5 using the equation (1).

Now, referring to the rows 708, 710 and 712 in the table 700, the second optimized slave transaction IDs are based on first optimized slave transaction IDs generated for the first processing subsystem 102A, as shown in FIGS. 2 and 6. In another embodiment, the slave transaction IDs for the first processing subsystem 102A is also optimized by determining whether there are any common don't care bits. As shown in the table 700, in the row 708 and the row 710, the slave transaction IDs 00ID1ID0_00 and 000ID0_01 include MSB two bits and the LSB bit [1] don't care bits. Therefore, these don't care bits can be removed to further optimize the slave transaction ID for the first processing subsystem 102A. As a result, 3 bits are sufficient to carry the ID information.

Now referring to the row 714 in the table 700, the actual master ID for the master M108A is ID1ID0 and the interconnect ID is 00. Therefore, the generated second optimized slave transaction ID for M108A to S110A-C is 0ID1ID0_00 after appending one zero to the MSB position. Further in the table 700, in the row 716, the actual master ID for the master M108B is ID2ID1ID0 and the interconnect ID is 01. Therefore, the generated second optimized slave transaction ID for M108B to S110A-C is ID2ID1ID0_01 without appending zeros to the MSB position. Furthermore in the table 700, in the row 718, based on the second optimized slave transaction ID width obtained, the actual master ID for the master M108C is ID2ID1ID0 and the interconnect ID is 10. Therefore, the generated second optimized slave transaction ID for M108C to S110A-C is ID2ID1ID0_10 without appending zeros to the MSB position.

In various embodiments, the methods and systems described in FIGS. 1 through 7 enable to optimize overall slave transaction ID width based on sparse connection information. Such optimization enables minimizing the slave transaction IDs to within acceptable limits to use with standard IPs. Also, the method described herein reduces the requirement of routing additional ID bits.

Although the present embodiments have been described with reference to specific example embodiments, it will be evident that various modifications and changes may be made to these embodiments without departing from the broader scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structures and methods may be embodied using transistors, logic gates, and electrical circuits, such as an application specific integrated circuit.

What is claimed is:

1. A method for optimizing slave transaction identification (ID) widths based on sparse connection in a multilayer multilevel interconnect system on chip (SOC) architecture, comprises:
    computing slave transaction ID widths for a first processing subsystem including multiple masters and multiple slaves;
    generating a slave transaction ID for each master to any slave in the first processing subsystem based on the computed slave transaction ID widths for the first processing subsystem;
    determining sparse connection information between the multiple masters and the multiple slaves via a first bus matrix in the first processing subsystem; and
    generating a first optimized slave transaction ID for each master to any slave in the first processing subsystem by removing don't care bits present in each generated slave transaction ID based on the sparse connection information.

2. The method of claim 1, wherein computing the slave transaction ID widths for the first processing subsystem including the multiple masters and the multiple slaves comprises:
    computing the slave transaction ID widths for the first processing subsystem including the multiple masters and the multiple slaves using an equation:

slave transaction ID width=largest master ID width+ $\log_2$(total number of masters).

3. The method of claim 1, wherein generating the first optimized slave transaction ID for each master to any slave in the first processing subsystem by removing don't care bits present in each generated slave transaction ID based on the sparse connection information comprises:
    determining whether there are any common don't care bits in the generated slave transaction ID for each master in the first processing subsystem based on the determined sparse connection information; and
    generating the first optimized slave transaction ID by removing the common don't care bits in the generated slave transaction ID based on the determination.

4. The method of claim 1, further comprising:
    determining whether there are any further don't care bits left in the generated first optimized slave transaction ID for each master in the first processing subsystem; and
    generating a second optimized slave transaction ID by removing any common don't care bits left in the generated first optimized slave transaction ID for each master based on the determination.

5. The method of claim 1, wherein the first processing subsystem are selected from the group consisting of a microprocessor, a direct memory access (DMA), a memory controller, a display controller, a camera controller, an interrupt controller and a timer.

6. The method of claim 1, wherein, in generating the first optimized slave transaction ID and a second optimized slave transaction ID for a second processing subsystem including multiple masters and multiple slaves, the multiple masters in the first processing system are connected to the associated multiple slaves via the first bus matrix and respective master interfaces and slave interfaces,
    wherein the multiple masters in the second processing system are connected to the associated multiple slaves via a second bus matrix and respective master interfaces and slave interfaces, and wherein a third bus matrix connects the first processing subsystem and the second processing subsystem via a slave interface of the first processing subsystem and a master interface of the second processing subsystem.

7. The method of claim 1, further comprising:
computing slave transaction ID widths for a second processing subsystem including multiple masters and multiple slaves; and
generating a slave transaction ID for each master to any slave in the second processing subsystem based on the computed slave transaction ID widths for the second processing subsystem.

8. The method of claim 3, wherein the don't care bits are most/least significant bits that are equal to zero.

9. A system for optimizing a slave transaction identification (ID) width based on sparse connection in a multilayer multilevel interconnect system on chip (SOC) architecture, comprising:
a first processing subsystem including multiple masters and multiple slaves, wherein the multiple masters are connected to the multiple slaves via a first bus matrix and respective master interfaces and slave interfaces;
a second processing subsystem including multiple masters and multiple slaves, wherein the multiple masters are connected to the multiple slaves via a second bus matrix and respective master interfaces and slave interfaces; and
a third bus matrix connecting the first processing subsystem and the second processing subsystem via a slave interface of the first bus matrix in the first processing subsystem and a master interface of the second bus matrix in the second processing subsystem, wherein the slave transaction ID width of each master associated with the first processing subsystem, and the slave transaction ID width of each master associated with the second processing subsystem are based on a first optimized slave transaction ID, wherein the slave transaction ID width of each master associated with the first processing subsystem and the slave transaction ID width of each master associated with the second processing subsystem are further based on a second optimized slave transaction ID that is based on subsequent optimization of the first optimized slave transaction ID.

10. The system of claim 9, wherein the first optimized slave transaction ID is formed by removing don't care bits present in each generated slave transaction ID based on the sparse connection information.

11. The system of claim 9, wherein the second optimized slave transaction ID is formed by removing any common don't care bits left in the generated first optimized slave transaction ID for each master based on the sparse connection.

12. The system of claim 9, wherein the masters are selected from the group consisting of a microprocessor, a direct memory access (DMA) and a digital signal processing device (DSP).

13. The system of claim 9, wherein the slaves are selected from the group consisting of a timer, an interrupt controller, a unified asynchronous receiver transmitter (UART) peripheral device, a module and an interface.

14. A system for optimizing a slave transaction identification (ID) width based on sparse connection in a multilayer multilevel interconnect system on chip (SOC) architecture, comprising:
a first processing subsystem including multiple masters and multiple slaves, wherein the multiple masters are connected to the multiple slaves via a first bus matrix and respective master interfaces and slave interfaces;
a second processing subsystem including multiple masters and multiple slaves, wherein the multiple masters are connected to the multiple slaves via a second bus matrix and respective master interfaces and slave interfaces; and
a third bus matrix connecting the first processing subsystem and the second processing subsystem via a slave interface of the first bus matrix in the first processing subsystem and a master interface of the second bus matrix in the second processing subsystem, wherein the slave transaction ID width of each master associated with the first processing subsystem, and the slave transaction ID width of each master associated with the second processing subsystem are based on a first optimized slave transaction ID, wherein the first optimized slave transaction ID is formed by removing don't care bits present in each generated slave transaction ID based on the sparse connection information.

15. The system of claim 14, wherein the masters are selected from the group consisting of a microprocessor, a direct memory access (DMA) and a digital signal processing device (DSP).

16. The system of claim 14, wherein the slaves are selected from the group consisting of a timer, an interrupt controller, a unified asynchronous receiver transmitter (UART) peripheral device, a module and an interface.

* * * * *